UNITED STATES PATENT OFFICE.

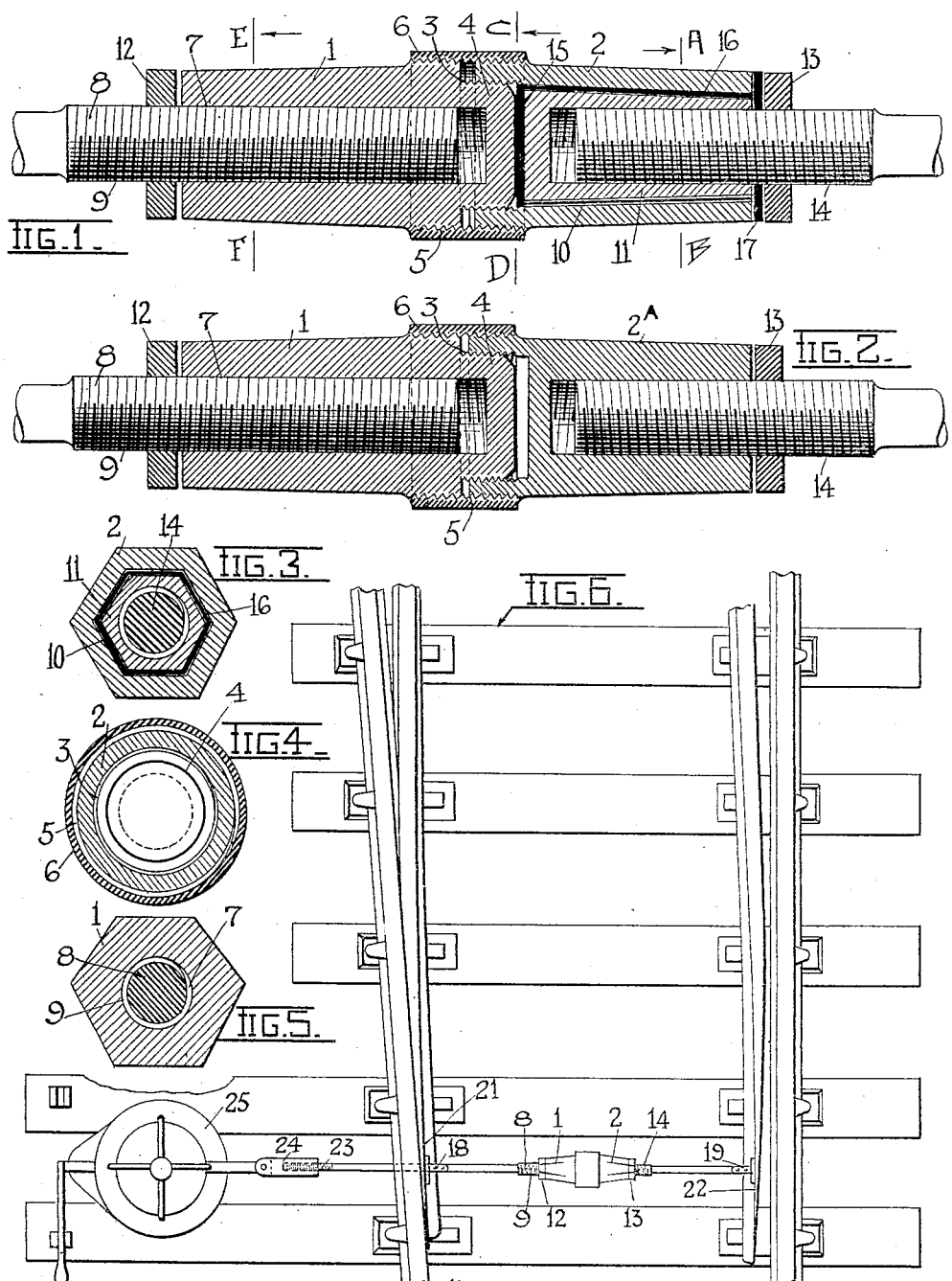

HARRY A. LAWLER AND CHARLES A. LAWLER, OF HORTON, KANSAS.

SWITCH-ROD.

1,068,144. Specification of Letters Patent. Patented July 22, 1913.

Application filed March 8, 1913. Serial No. 752,916.

*To all whom it may concern:*

Be it known that we, HARRY A. LAWLER and CHARLES A. LAWLER, citizens of the United States, residing at Horton, in the county of Brown and State of Kansas, have invented certain new and useful Improvements in Switch-Rods, of which the following is a specification.

Our improvement relates to an adjustable connecting means for switch points, and more particularly to a type of the above mentioned connecting means which may or may not be arranged to electrically insulate the points connected, one from the other.

The object is to provide an insulated adjustable connecting means or turnbuckle that may be used in connection with the suspension or adjustment of any form of current carrying wire or other means besides the above use mentioned.

The improvement consists broadly, of an adjustable connecting means between two points, the said means being for insulated or noninsulated connections.

Other uses and advantages of our form of turnbuckle will be obvious to those skilled in mechanics after referring to the illustrations and detailed description, in which we have shown our at present, preferred form of the improvement. We will, however, claim the right to make any mechanical alterations in the size, shape, proportions, or material used or the use to which it may be put, as long as we do not depart from the spirit of the invention as set forth in the annexed claims.

In the drawings—Figure 1 is a longitudinal section of our preferred form of turnbuckle or adjusting means, showing the parts arranged to form an insulation between the points connected. Fig. 2 is a similar view to Fig. 1 showing the noninsulated form of buckle. Figs. 3, 4 and 5, are transverse sectional views of Fig. 1 on the lines A—B, C—D, and E—F respectively, in the order mentioned. Fig. 6 is a plan view showing our invention as applied to a split switch rod having a switch stand connected thereto.

Referring specifically to the reference characters of the drawings, the numerals 1 and 2 indicate the connecting sockets which are joined by primary screw threads at 3, the said threads being disposed upon the outer surface of a reduced inner end 4 of the socket 1 and a portion of the inner surface of the near end of the socket 2. The sockets 1 and 2 are further joined at 5 by the collar 6. Threads are disposed upon a portion of the outer surfaces of the near ends of the sockets 1 and 2 and the inner surface of the collar 6, secondary to the screw threads at 3 which are somewhat finer, thus serving the double purpose of additionally binding the parts together and of forming a locking means to prevent displacement. The socket 1 is hollow and has a screw threaded inner wall 7 adapted to secure a rod 8 having screw threads 9 of similar size and pitch, (see Fig. 5). The socket 2 is hollow but has smooth tapering walls 10 of hexagonal sections (see Fig. 3) in which is mounted an inner socket 11 having outer walls parallel to and of similar cross-section to the inner walls of the socket 2. The inner socket 11 is hollow and is provided with a screw threaded inner wall similar to the socket 1, the threads being right handed in one instance and left handed in the other.

The numerals 12 and 13 indicate lock nuts disposed on either rod 8 and 14. The rod 14 is threaded and similar to the rod 8, the threads, of course, being disposed "to the other hand".

The parts 15, 16, and 17 as views in Fig. 1, are electrical insulating means of any desired material fitted as shown.

When the improvement is used in connection with railway switches as shown in Fig. 6, brackets 18 and 19 will be riveted to the rods 8 and 14 and bolted to the vertical flange of the rails 21 and 22 in the best mechanical manner. The rod 8 or the one nearest the switch stand will be provided with screw threads 23 at its outer end upon which will be mounted an internally threaded jaw piece 24 for the purpose of making any desired adjustments between the switch and the switch stand 25.

In the noninsulated or modified form of buckle as shown in Fig. 2 the socket 2^A is somewhat different from the socket 2 shown in Fig. 1, the former being in one piece, as it were, having the inner socket 11 formed integral with the outer one.

It is our intention at present to form the sockets at their outer ends hexagonal in cross section as shown in Figs. 3 and 5, the same as the lock nuts 12 and 13, and gradually run them into a circular cross-section at the central portion, as shown in Figs. 4 and 6.

In practice, we may conclude to make the outer surface of the collar 6 hexagonal instead of circular so that an ordinary open jawed wrench carried by linemen may be used for an adjustment instead of a Stilson, as would be required for the circular section shown in the illustration.

It would be a simple matter with our form of buckle to change from insulated to non-insulated or vice versa.

Assuming the buckles to be assembled but without the rods 9 and 14 and of course the lock nuts 12 and 13, to change from non-insulated to insulated, it is only necessary to remove the collar 6, unscrew the socket 2 from socket 1, removing both inner and outer sockets, and replacing the same with the socket 2^A.

Having described our improvement, we claim:—

1. An adjustable connecting means comprising right and left hand internally threaded connecting sockets, the said sockets having double screw threaded locking and securing means, the said means comprising an internally threaded collar mounted upon the near ends of outer threaded portions of the sockets, and an externally threaded reduced end of one socket mounted in an internally threaded counterbored portion of the other socket.

2. An adjustable connecting means comprising two connected sockets having an external locking means, one socket being provided with a screw threaded inner wall, and the other with smooth inner walls presenting an open ended compartment, the said compartment being smaller at the outer end; an inner socket mounted within the outer socket, the outer walls of the latter conforming to the inner walls of the former; a screw threaded opening in the inner socket, screw threaded rods mounted in the openings in the first mentioned socket, and in the latter mentioned inner socket; lock nuts mounted upon the outer ends of the threaded portions of the said rods, and insulating means between the walls of the inner socket and the outer socket and between the outer ends of the inner and outer sockets and the lock nuts.

3. An adjustable connecting means consisting of a socket having a threaded inner wall, a smooth tapered outer wall, an externally threaded portion at the greatest diameter, a reduced threaded inner end, an adjoining socket having smooth tapered inner and outer walls, a threaded portion on the inner and the outer walls at the greatest diameter, the former mentioned threaded portion mounted upon the reduced threaded inner end of the first mentioned socket, an internally threaded collar mounted upon the two near ends of the outer threaded portions of the sockets; an inner socket mounted within the outer socket, a screw threaded opening in the inner socket, and screw threaded rods mounted in the threaded openings of the first mentioned socket and in the latter mentioned inner socket; and insulating means between the walls of the inner socket and the outer socket and between the outer ends of the inner and outer sockets and the lock nuts.

In testimony whereof we affix our signatures in presence of two witnesses.

HARRY A. LAWLER.
CHARLES A. LAWLER.

Witnesses:
H. L. BALDWIN,
JOHN M. McGONIGLE.

Copies of this patent may be obtained for five cents each, by addressing the "Commissioner of Patents, Washington, D. C."